UNITED STATES PATENT OFFICE.

GEORGE A. COWLES, JESSE P. CASE, AND VICTOR VIEROW, OF NEW YORK, N. Y.

IMPROVED COMPOSITION FOR PRESERVING AND WATERPROOFING VEGETABLE FIBERS.

Specification forming part of Letters Patent No. 44,285, dated September 20, 1864.

*To all whom it may concern:*

Be it known that we, GEORGE A. COWLES, JESSE P. CASE, and VICTOR VIEROW, of the city, county, and State of New York, have invented a new and Improved Composition for Preserving and Waterproofing Vegetable Fibers; and we do hereby declare that the following is a full, clear, and exact description thereof, which will enable others skilled in the art to fully understand and use the same.

This invention consists in the employment or use of blue vitriol or sulphate of copper mixed with alum, to which soap or oil, gelatine, acetate of lead, and gum-arabic may be added, if desired.

The proportion in which we mix the various ingredients of our composition together is about as follows: alum, two pounds, dissolved in sixty pounds of water; blue vitriol, two pounds, dissolved in sixty pounds of water. To this composition may be added gelatine or glue, one pound, dissolved in thirty pounds of water; castile soap, one-half pound, dissolved in thirty pounds of water; or, instead of soap, a small quantity of oil can be substituted, which, when brought in contact with the alum, saponifies and is rendered capable of being mixed with the other ingredients. Each of these ingredients is dissolved by itself in hot or boiling water, and while warm the second, third, &c., parts are added to the first, and the whole is well stirred to combine them thoroughly, and, finally, we add to this, while warm, the solution of vitriol cold. This composition may be still further improved by the addition of the following ingredients, in about the proportion hereinafter stated: acetate of lead, one-half pound, dissolved in thirty pounds of water; gum-arabic, one-half pound, mixed with the glue or gelatine. The acetate of lead is dissolved in warm water, and this solution is combined with the solution of alum, and after the mixture has been filtered it is used as one solution in mixing with the other ingredients.

It is well known that blue vitriol or sulphate of copper acts in some measure as a preservative of vegetable fibers; but when applied for itself and without other ingredients its action is not sufficiently powerful to be of much practical value, and it has therefore never been commonly used. By the addition of the alum, in about the proportions above specified, the preserving qualities of the mixture are considerably enhanced, and when these ingredients are mixed with gelatine the fibers are not only preserved against rotteness, but they are also rendered impervious to water, and this last-named quality is still further improved by the addition of acetate of lead and gum-arabic.

Our composition is cheap, and its application does not in the least interfere with the strength of the fibers. It can be applied with advantage to vegetable fibers of any description.

Having thus described our invention, we claim as new and desire to secure by Letters Patent—

1. The use of a composition of alum and blue vitriol, mixed together substantially in the manner and about in the proportion above set forth.

2. The use of a composition of alum and vitriol mixed with gelatine or with soap, or with a mixture of gelatine and soap or oil, substantially in the manner and about in the proportion specified.

3. The employment of acetate of lead, with or without gum-arabic, in combination with the ingredients hereinbefore named, and mixed together substantially in the manner and about in the proportion set forth.

GEO. A. COWLES.
J. P. CASE.
VICTOR VIEROW.

Witnesses:
F. E. BELL,
M. M. LIVINGSTON.